United States Patent
Kao et al.

(10) Patent No.: US 9,134,812 B2
(45) Date of Patent: Sep. 15, 2015

(54) IMAGE POSITIONING METHOD AND INTERACTIVE IMAGING SYSTEM USING THE SAME

(71) Applicant: PixArt Imaging Inc., Hsin-Chu County (TW)

(72) Inventors: Ming-Tsan Kao, Hsin-Chu (TW); Shu-Sian Yang, Hsin-Chu (TW); Han-Ping Cheng, Hsin-Chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 13/846,217

(22) Filed: Mar. 18, 2013

(65) Prior Publication Data
US 2013/0265230 A1    Oct. 10, 2013

(30) Foreign Application Priority Data
Apr. 6, 2012  (TW) .............. 101112414 A

(51) Int. Cl.
G06F 3/03    (2006.01)
G06K 9/32    (2006.01)
G06K 9/38    (2006.01)

(52) U.S. Cl.
CPC ............ *G06F 3/0304* (2013.01); *G06K 9/3241* (2013.01); *G06K 9/38* (2013.01); *G06F 3/0325* (2013.01)

(58) Field of Classification Search
CPC ..... G06F 3/0304; G06F 3/014; G06F 3/0325; G06F 3/0346; G06F 3/038; G06F 3/04892; G06F 3/2092
USPC ......... 345/156–157, 163, 183, 419, 581, 589; 386/239, 296, 291, 234, 244, 248, 261
See application file for complete search history.

(56) References Cited

U.S. PATENT DOCUMENTS

| | | | |
|---|---|---|---|
| 7,796,116 B2 | 9/2010 | Salsman et al. | |
| 2004/0066970 A1* | 4/2004 | Matsugu | 382/217 |
| 2004/0174569 A1* | 9/2004 | Karito | 358/3.01 |
| 2006/0152488 A1* | 7/2006 | Salsman et al. | 345/158 |
| 2006/0245649 A1* | 11/2006 | Chen et al. | 382/173 |
| 2006/0245652 A1 | 11/2006 | Chen | |
| 2007/0060383 A1* | 3/2007 | Dohta | 463/43 |
| 2009/0174634 A1* | 7/2009 | Kohno | 345/84 |
| 2009/0203445 A1* | 8/2009 | Dohta et al. | 463/39 |
| 2012/0147165 A1* | 6/2012 | Yoshino et al. | 348/65 |

FOREIGN PATENT DOCUMENTS

TW    201137790 A    11/2011

* cited by examiner

*Primary Examiner* — Lun-Yi Lao
*Assistant Examiner* — Md Saiful A Siddiqui
(74) *Attorney, Agent, or Firm* — Lowe Hauptman & Ham, LLP

(57) ABSTRACT

There is provided an image positioning method including the steps of: capturing an image frame with an image sensor; identifying at least on object image in the image frame; comparing an object image size of the object image with a size threshold and identifying the object image having the object image size larger than the size threshold as a reference point image; and positioning the reference point image. There is further provided an interactive imaging system.

13 Claims, 4 Drawing Sheets

IMAGE POSITIONING METHOD AND INTERACTIVE IMAGING SYSTEM USING THE SAME

CROSS REFERENCE TO RELATED APPLICATION

This application claims the priority benefit of Taiwan Patent Application Serial Number 101112414, filed on Apr. 6, 2012, the full disclosure of which is incorporated herein by reference.

BACKGROUND

1. Field of the Disclosure

This disclosure generally relates to a pointing system and, more particularly, to an image positioning method and an interactive imaging system using the same.

2. Description of the Related Art

An interactive imaging system generally utilizes an image sensor to capture a plurality of image frames containing at least one reference point image and correspondingly controls an electronic device according to a position variation of the reference point image between image frames, such as controlling the motion of a cursor shown on a display screen. To correctly control the cursor, first it is necessary to correctly position the reference point image in the image frames.

For example U.S. Pat. No. 7,796,116, entitled "electronic equipment for handheld vision based absolute pointing system", discloses an image positioning method. Referring to FIG. 1A, the image positioning method includes the steps of: determining an intensity value of every pixel in an image frame 9; determining a rectangular range 92 containing a reference point image 91; identifying a plurality of valid pixels within the rectangular range 92 having the intensity value higher than a predetermined threshold; and determining a coordinate of the reference point image 91 according to the intensity value and a pixel position of each of the valid pixels.

In said conventional image positioning method, it is assumed that the intensity value of noise in the image frame 9 does not exceed the predetermined threshold and the positioning of the reference point image 91 is performed based on this assumption. However, actually when there is noise existing within the rectangular range 92, the noise may cause the intensity value of a part of pixels to be higher than the predetermined threshold, such as the pixel 921 shown in FIG. 1B. In this case, if the coordinate of the reference point image 91 is calculated according to the above conventional image positioning method, the calculated coordinate may have a shift from the actual coordinate.

In addition, within the range of the reference point image 91, noise may cause a part of pixels to have the intensity value lower than the predetermined threshold, such as the pixel 911 shown in FIG. 1B. In this case, if the coordinate of the reference point image 91 is calculated according to the above conventional image positioning method, the calculated coordinate may also have a shift from the actual coordinate. If the calculated coordinate of the reference point image 91 is incorrect, it may not be able to correctly perform the desired control.

Accordingly, the present disclosure further provides an image positioning method and an interactive imaging system using the same that can eliminate the interference from noise and improve the accuracy and stability of the positioning.

SUMMARY

The present disclosure provides an image positioning method and an interactive imaging system using the same that may eliminate the interference from noise and ambient light by comparing an object image with a size threshold and by identifying whether a reference point image is a hollow image.

The present disclosure provides an image positioning method including the steps of: capturing an image frame with an image sensor; identifying at least one object image in the image frame with a processing unit; comparing, using the processing unit, an object image size of the at least one object image with a size threshold and identifying the object image having the object image size larger than the size threshold as a reference point image; and positioning the reference point image with the processing unit.

The present disclosure further provides an interactive imaging system including an electronic device and a remote controller. The electronic device includes at least one reference point and a receive unit, wherein the receive unit is configured to receive a control signal. The remote controller includes an image sensor, a processing unit and a transmitter. The image sensor is configured to successively capture a plurality of image frames containing at least one object image. The processing unit is configured to identify the at least one object image in the plurality of the image frames, identify a reference point image associated with the reference point according to an object image size of the at least one object image and position the reference point image. The transmitter is configured to transmit the control signal according to information of the reference point image.

The present disclosure further provides an interactive imaging system including a display device and a remote controller. The display device includes at least one reference point irradiating light of a predetermined spectrum. The remote controller is configured to successively capture a plurality of image frames containing at least one object image, identify a reference point image associated with the reference point according an object image size of the at least one object image, position the reference point image and correspondingly control the display device according to a position variation of the reference point image.

In the image positioning method of the present disclosure and the interactive imaging system using the same, the intensity threshold may have a constant value or a variable value; wherein the constant value may be previously set and the variable value may be an average intensity value of one image frame multiplied by a ratio, which may be determined according to a variance of the intensity value of every pixel in the image frame.

In the image positioning method of the present disclosure and the interactive imaging system using the same, the size threshold may have a constant value or a variable value; wherein the constant value may be previously set and the variable value may be an average size of the reference point image in one image frame multiplied by a ratio, which may be determined according to a variance of the size of every reference point image in the image frame.

In the image positioning method of the present disclosure and the interactive imaging system using the same, one pixel or a plurality of adjacent pixels in an image frame having an intensity value larger than an intensity threshold are identified as an object image; the object image with an object image size satisfying the size requirement is identified as a reference point image; and a gravity center or a center of the reference point image is calculated according an intensity value and a pixel position of every pixel of the reference point image so as to perform the positioning of the reference point image.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
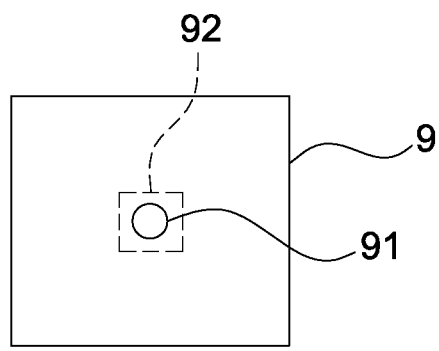
FIGS. 1A and 1B show schematic diagrams of the conventional image positioning method.
Figure 1B:
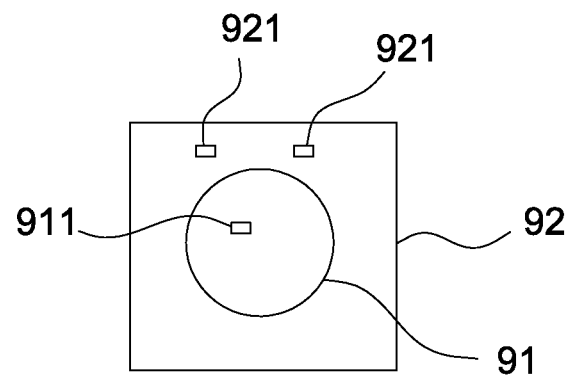
Figure 2:
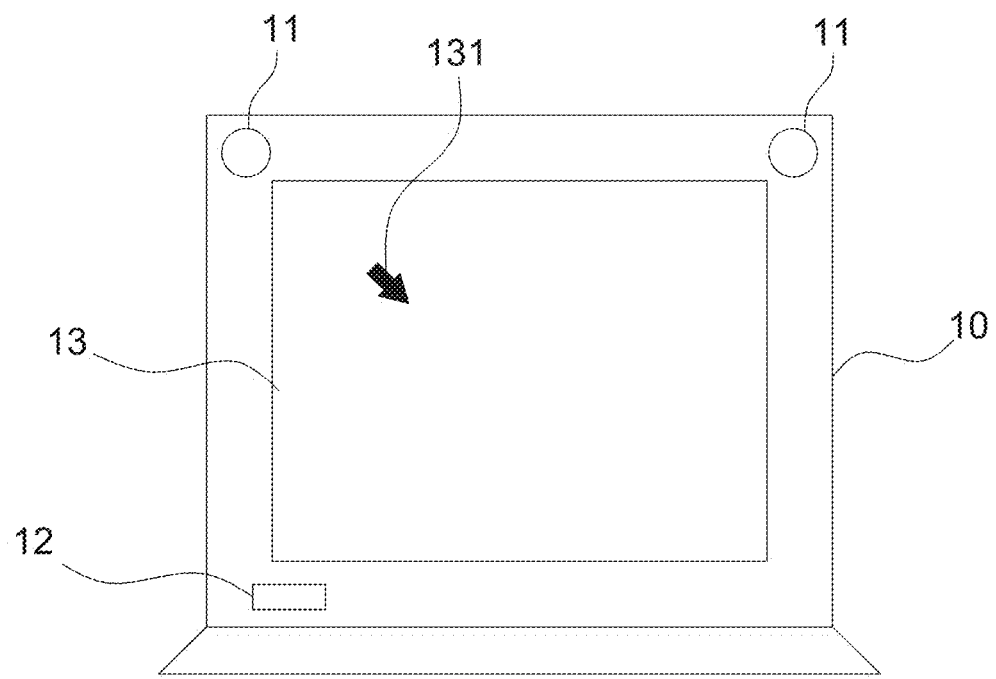
FIG. 2 shows a schematic diagram of the interactive imaging system according to an embodiment of the present disclosure.
Figure 2:
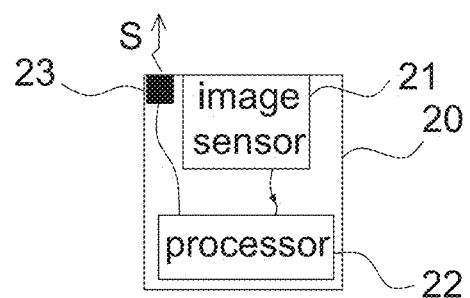

Referring to FIG. 2, it shows a schematic diagram of the interactive imaging system according to an embodiment of the present disclosure. The interactive imaging system includes an electronic device 10 and a remote controller 20. The remote controller 20 is configured to successively capture a plurality of image frames containing at least one object image, to identify a reference point image associated with at least one reference point according to an object image size of the at least one object image, to position the reference point image and to correspondingly control the electronic device 10 according to a position and/or a position variation of the reference point image, such as controlling the motion of a cursor shown on the electronic device 10 or controlling a software being executed, but not limited thereto. In the present disclosure, said object image is referred to an object image whose object size has not been identified and thus an object image may be referred to a reference point image, an ambient light image or noise; and said reference point image is referred to the object image whose image size satisfies a predetermined size range herein.

The electronic device 10 includes at least one reference point 11 (e.g. two reference points are shown herein) and a receive unit 12. The reference point 11 may be a light emitting diode (LED) or a laser diode and is configured to irradiate light of a predetermined spectrum; preferably irradiating red light, infrared light or other invisible light. The receive unit 12 is configured to wiredly or wirelessly coupled to the remote controller 20 for receiving a control signal S sent from the remote controller 20. For example, when the electronic device 10 is a display device having a display screen 13, a cursor 131 may be shown on the display screen 13 for being controlled by the remote controller 20, wherein the method of an electronic device controlled by a remote controller is well known to the art and the spirit of the present disclosure is to correctly position the coordinate of the reference point image. In addition, wiredly and wireless techniques are well known to the art and thus details thereof are not described herein. In another embodiment, the reference point 11 may be physically separated from the electronic device 10.

The remote controller 20 includes an image sensor 21, a processing unit 22 and a transmitter 23. The image sensor 21 may be a CMOS image sensor, a CCD image sensor or other sensors for sensing optical energy and is configured to successively capture and output a plurality of image frames containing at least one object image, wherein the image frames may be analog images or digital images. For example, when the image sensor 21 outputs digital images the image sensor 21 may include an analog-to-digital conversion unit configured to convert analog signals to digital signals. The processing unit 22 may be a digital signal processor (DSP) configured to receive and post-process the image frames outputted by the image sensor 21, such as identifying the object image in the image frames, identifying a reference point image associated with at least one reference point according to an object image size and/or an object image shape of the object image and positioning the reference point image. Finally, the processing unit 22 send the control signal S to the electronic device 10 through the transmitter 23 wiredly or wirelessly according to information of the reference point image between successive image frames (such as a position variation) to perform corresponding control. When the image sensor 21 outputs analog signals the processing unit 22 may include an analog-to-digital conversion unit configured to convert analog signals to digital signals. In other words, the processing unit 22 is configured to position the reference point image according to digital images.

More specifically in the present embodiment, the remote controller 20 distinguishes the reference point image and the noise according to the size and the shape of the object image before starting to perform the positioning so as to increase the accuracy and the operational stability of the positioning procedure.

It is appreciated that the remote controller 20 generally includes a register (not shown) configured to save the data and parameters for calculation, wherein the register may or may not be included in the processing unit 22.

Figure 3:
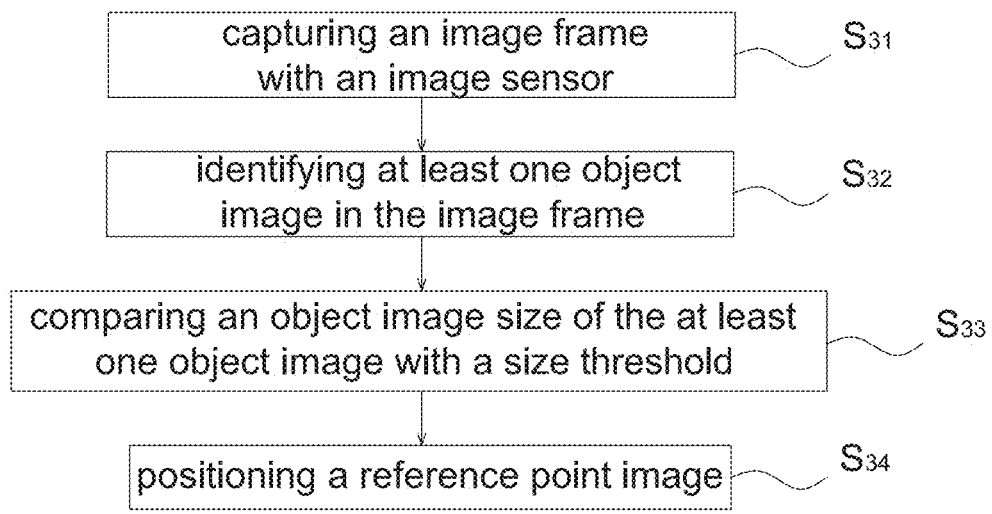
FIG. 3 shows a flow chart of the image positioning method according to an embodiment of the present disclosure.

Referring to FIG. 3, it shows a flow chart of the image positioning method according to an embodiment of the present disclosure including the steps of: capturing an image frame with an image sensor (Step $S_{31}$); identifying at least one object image in the image frame with a processing unit (Step $S_{32}$); comparing, using the processing unit, an object image size of the at least one object image with a size threshold and identifying the object image having the object image size larger than the size threshold as a reference point image (Step $S_{33}$); and positioning the reference point image with the processing unit (Step $S_{34}$). After the positioning of the reference point image in the image frames is accomplished, a control signal S may be outputted to the electronic device 10 via the transmitter 23 according to a position and/or a position variation of the reference point image. Details of the image positioning method according to the present embodiment are illustrated hereinafter.

Step $S_{31}$: The image sensor 21 of the remote controller 20 successively captures image frames at a sampling frequency and the captured image frames are sent to the processing unit 22.

Step $S_{32}$: The processing unit 22 of the remote controller 20 identifies a pixel or a plurality of adjacent pixels, which are connecting with each other, having an intensity value larger than an intensity threshold as an object image. In the present embodiment, the processing unit 22 may identify the object image using two ways.

In one aspect, the processing unit 22 may save the whole of the image frame in the register at first. Next, the processing unit 22 compares an intensity value of each of the pixels of the image frame with at least one intensity threshold. When the intensity value of every pixel of a pixel region (including one or a plurality of pixels) is larger than the intensity threshold, the pixel region is identified as an object image and a plurality of pixels having the intensity value larger than the intensity threshold and adjacent to each other are identified to belong to the same object image. It is appreciated that a part of pixel regions in the image frame may be identified as an object image due to the noise. The intensity threshold may be a predetermined ratio of an expressible gray level range. For example, when the intensity value is expressed by 256 gray levels, the intensity threshold may be 0.5×256, wherein the predetermined ratio may be determined according to identification requirements.

In another aspect, the processing unit 22 sequentially receives pixel data of each pixel and compares the pixel data with at last one intensity threshold at the time receiving the pixel data. When the intensity value of the pixel data is larger then the intensity threshold, a valid pixel is identified and the pixel data is saved in the register and then the processing unit 22 identifies the pixel data of a next pixel. In this aspect the occupied space of the register can be reduced.

Figure 4:
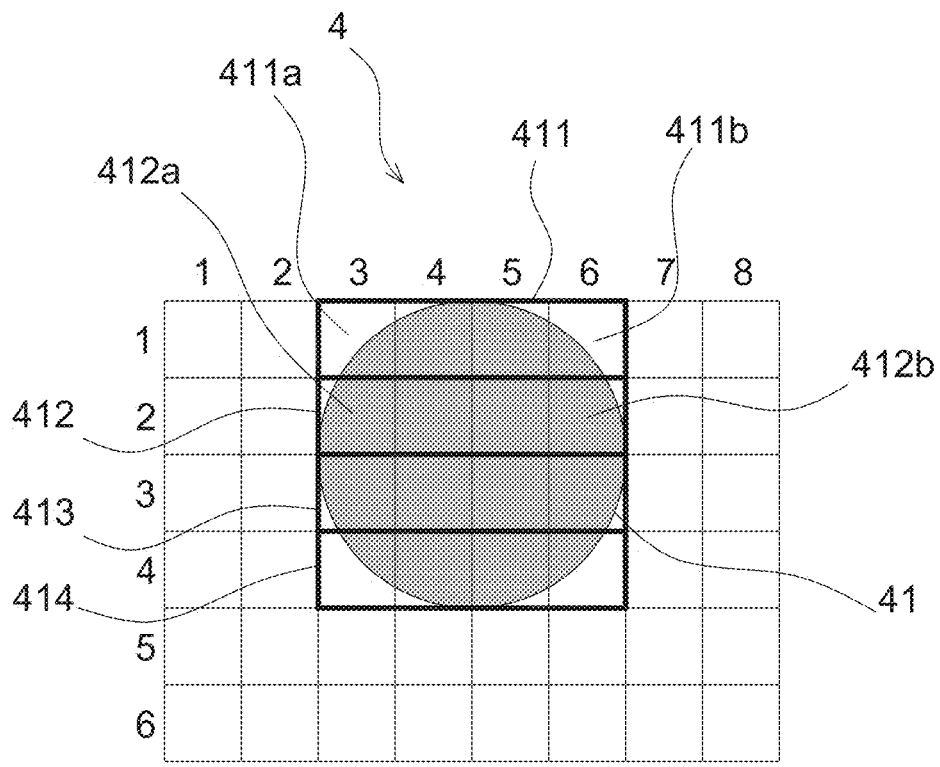
FIG. 4 shows a schematic diagram of the image frame and the object image in the image positioning method according to the embodiment of the present disclosure.

Referring to FIG. 4, in an image frame 4, it is assumed that the processing unit 22 sequentially reads every pixel row-by-row and column-by-column from the first pixel of the first row. For example, the intensity value at the pixel coordinate (3,1) is larger than the intensity threshold, and the processing unit 22 records a start coordinate 411a of an image section 411 in the register. Next, the processing unit 22 records information (e.g. pixel coordinate and gray level) of every pixel in the image section 411, which starts from the start coordinate 411a, in the register. Then, for example the intensity value at the pixel coordinate (7,1) is smaller than the intensity threshold, and the processing unit 22 records an end coordinate 411b of the image section 411 in the register and the identification of the first row is ended. It is appreciated that if the first row includes another image section, information of each pixel of said another image section may be identified and recorded in a similar way.

Next, the same procedure is used to respectively identify and record a start coordinate 412a, an image section 421 and an end coordinate 412b in the second row. Next, if the following condition is satisfied, the image sections 411 and 412 are identified to belong to the same object image, Seg_L≤Preline_Obj$_{i\_}$R; and Seg_R≥Preline_Obj$_{i\_}$L wherein if the Y row of the image frame is being read now, Seg_L indicates a left start coordinate of the image section (e.g. 412) of an unknown object image in the Y row; Seg_R indicates a right end coordinate of the unknown object image in the Y row; Preline_Obj$_{i\_}$L indicates a left start coordinate of the image section (e.g. 411) of an object image i in the Y-1 row; and Preline_Obj$_{i\_}$R indicates a right end coordinate of the object image i in the Y-1 row. In other words, a plurality of pixels that are adjacent to each other and have the intensity value larger than the intensity threshold are identified to belong to the same object image. Next, information of the object image in other rows may be identified and recorded using the same procedure. Details of the above identification procedure may be referred to U.S. Publication No. US2006/0245649 and US2006/0245652 assigned to the same assignee as the present application. Similarly, a part of pixel regions in the image frame 4 may be identified as an object image due to noise interference.

After this step is accomplished, the processing unit 22 of the remote controller 20 may identify at least one object image which has a specific shape, wherein said specific shape may be determined according to the identification method adopted, such as a rectangular shape or an irregular shape.

Figure 5:
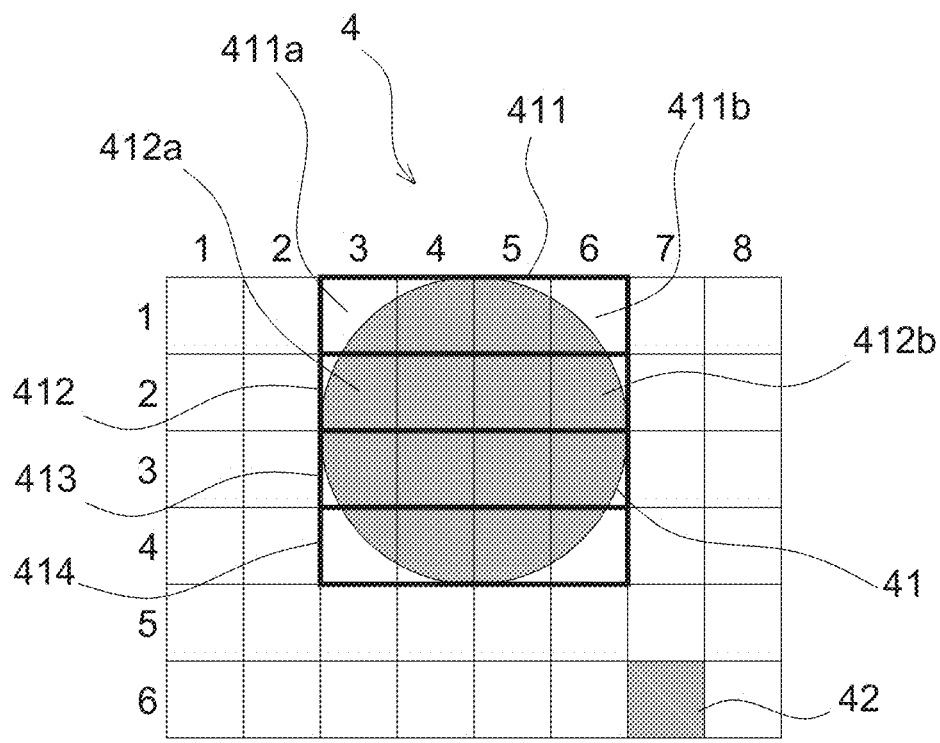
FIG. 5 shows another schematic diagram of the image frame and the object image in the image positioning method according to the embodiment of the present disclosure.

Step $S_{33}$: The processing unit 22 of the remote controller 20 compares the object image identified in the step $S_{32}$ with a size threshold (or a size range) so as to eliminate the interference from noise and ambient light. For example, an object image having an object image size larger than a size threshold may be identified as a reference point image and an object image having an object image size smaller than the size threshold may be identified as noise. For example referring to FIG. 5, the image frame 4 is identified to contain an object image 41 and an object image 42, and it is assumed that the object image 42 has the intensity value larger than the intensity threshold due to noise interference. In this embodiment, it is able to set the size threshold as 3 pixels, but not limited to, and an object image will be identified as noise and eliminated when it is smaller than 3 pixels. Therefore, the object image 42 in FIG. 5 will be eliminated in the positioning procedure. In addition, when an object image having an object image size larger than a predetermined area, it may be identified as ambient light interference and then be eliminated, wherein the predetermined area may be determined according to the size of the reference point 11 and an operation distance between the remote controller 20 and the electronic device 20. For example, reference point sizes associated with different operation distances may be previously recorded. In addition, when a reference point image is identified, the processing unit 22 of the remote controller 20 may further identify whether the reference point image satisfies a predetermined shape (such as a circular shape herein), and the reference point image that does not satisfy the predetermined shape may be identified as an image of another object in the environment so as to eliminate the interference from ambient light.

Step $S_{34}$: The processing unit 22 of the remote controller 20 may perform the positioning procedure by calculating a gravity center or a center of the reference point image to be served as the coordinate of the reference point image. For example, the processing unit 22 may calculate the gravity center or the center of the reference point image according to intensity values and pixel positions of at least a part of pixels of the reference point image.

Finally, the processing unit 22 of remote controller 20 transmits the calculation result to the electronic device 10 through the transmitter 23.

Figure 6:
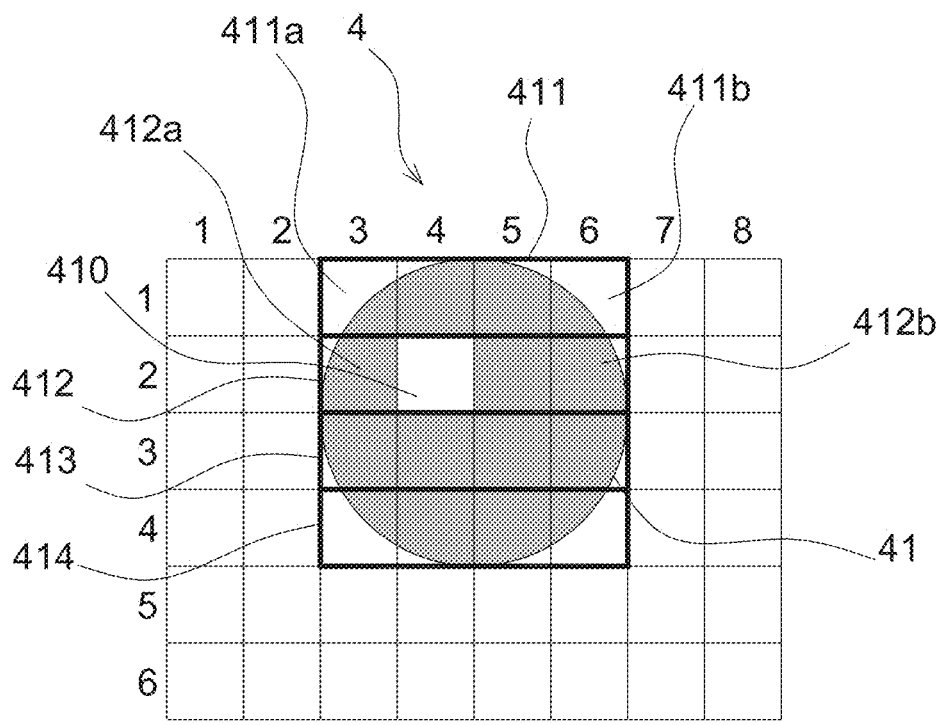
FIG. 6 shows another schematic diagram of the image frame and the object image in the image positioning method according to the embodiment of the present disclosure.

In another embodiment, the processing unit 22 of the remote controller 20 may further perform the step of identifying whether a reference point image is a hollow image or not so as to prevent a part of pixels, which have the intensity value lower than the intensity threshold, within the range of the reference point image from being eliminated in the positioning procedure due to noise interference; that is, the processing unit 22 of the remote controller 20 identifies whether there is any pixel within the reference point image having the intensity value lower than the intensity threshold and identifies whether the reference point image is a hollow image according to a pixel area of the pixel within the reference point image having the intensity value lower than the intensity threshold. For example referring to FIG. 6, it is assumed that the processing unit 22 identifies a reference point image 41 according to the Step $S_{33}$ and the reference point image 41 includes a pixel 410 having the intensity value lower than the intensity threshold (referred to a hollow area herein). The processing unit 22 calculates an area ratio of a pixel area of the hollow area and a total pixel area of the reference point image 41. When the area ratio is larger than an area threshold, it means that the hollow area is not caused by noise (i.e. the reference point image is actually a hollow image) and the intensity value and the pixel position of every pixel in the hollow area are eliminated in the positioning procedure. When the area ratio is smaller than the area threshold, it means that the hollow area is caused by noise (i.e. the reference point image is actually a solid image) and the intensity value and the pixel position of every pixel in the hollow area are included in the positioning procedure. Details of identifying a hollow or a solid object may be referred to U.S. Publication No. US2006/0245649 assigned to the same assignee as the present application. The processing unit 22 then calculates a gravity center or a center of the reference point image according to intensity values and pixel positions of at least a part of pixels (may or may not include the hollow area) in the reference point image.

In addition, in the present disclosure the intensity threshold and the size threshold may be constant values or variable values, wherein the variable values may be dynamically adjusted.

For example, after the identification of one image frame is accomplished, the processing unit 22 may calculate an average intensity value of all pixels of a current image frame and the average intensity value may be multiplied by a ratio (e.g. average intensity value×X %) to be served as a variable intensity threshold of a next image frame, wherein X may be an integer. In addition, a value of X may be adjusted according to a variance of intensity values of every pixel in the whole image frame. For example, when the variance becomes larger, it means that the difference of intensity values of every pixel in the whole image frame is larger and thus it is better to increase the value of X; on the contrary, when the variance becomes smaller, it means that the difference of intensity values of every pixel in the whole image frame is smaller and thus it is better to decrease the value of X, wherein the adjusted value of X may be positively related to the variance so as to increase the accuracy of identifying the object image. In other words, the intensity threshold may be determined according to an average intensity value, a maximum intensity value or a minimum intensity value of a previous image frame or a current image frame so as to determine the intensity threshold according to the intensity value of the captured image frame.

For example, after the identification of one image frame is accomplished, the processing unit 22 may calculate an average size of all reference point images in a current image frame and the average size may be multiplied by a ratio (e.g. average size×Y %) to be served as a variable size threshold of a next image frame, wherein Y may be an integer. In addition, a value of Y may be adjusted according to a variance of sizes of every reference point image in the whole image frame. For example, when the variance becomes larger, it means that the difference of sizes of every reference point image in the whole image frame is larger and thus it is better to increase the value of Y; on the contrary, when the variance becomes smaller, it means that the difference of sizes of every reference point image in the whole image frame is smaller and thus it is better to decrease the value of Y, wherein the adjusted value of Y may be positively related to the variance so as to increase the accuracy of identifying the reference point image.

In other words, the size threshold may be determined according to an average size of object image, a maximum size of object image or a minimum size of object image of a previous image frame or a current image frame so as to determine the size threshold according to the object image size in the captured image frame.

As mentioned above, the conventional image positioning method is easy to be interfered by noise such that the calculated image coordinate may have a shift from the actual coordinate. Therefore, the present disclosure further provides an image positioning method (FIG. 3) and an interactive imaging system using the same (FIG. 2) that may eliminate noise and improve the stability by comparing an object image with a size threshold and by identifying whether a reference point image is a hollow image or not.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An image positioning method, comprising:
capturing an image frame with an image sensor;
identifying a pixel or a plurality of adjacent pixels in the image frame having an intensity value larger than an intensity threshold as at least one object image in the image frame with a processing unit, wherein the intensity threshold is dynamically set as an average of intensity values of pixels of a previous image frame multiplied by a ratio X which is greater than zero and less than or equal to one, and the previous image frame is captured by the image sensor;
comparing, using the processing unit, an object image size of the at least one object image with a size threshold, which is a predetermined number of pixels, and identifying the object image having the object image size larger than the size threshold as a reference point image; and
positioning the reference point image with the processing unit according to intensity values and pixel positions of at least a part of pixels of the reference point image.

2. The image positioning method as claimed in claim 1, wherein the size threshold has a constant value or a variable value; and the variable value is an average size of the reference point image in one image frame multiplied by a ratio.

3. The image positioning method as claimed in claim 1, further comprising:
identifying, using the processing unit, whether the reference point image is a hollow image.

4. The image positioning method as claimed in claim 1, further comprising:
identifying, using the processing unit, whether the reference point image satisfies a predetermined shape.

5. An interactive imaging system, comprising:
an electronic device, comprising:
at least one reference point; and
a receive unit configured to receive a control signal; and
a remote controller, comprising:
an image sensor configured to successively capture a plurality of image frames containing at least one object image;
a processing unit configured to
identify a pixel or a plurality of adjacent pixels in the image frames having an intensity value larger than an intensity threshold as the at least one object image in the plurality of the image frames, wherein the intensity threshold is dynamically set as an average of intensity values of pixels of a previous image frame multiplied by a ratio X which is greater than zero and less than or equal to one, and the previous image frame is captured by the image sensor, identify the object image having an object image size larger than a size threshold, which is a predetermined number of pixels, as a reference point image associated with the reference point, and position the reference point image according to intensity values and pixel positions of at least a part of pixels of the reference point image; and a transmitter configured to transmit the control signal according to information of the reference point image.

6. The interactive imaging system as claimed in claim 5, wherein the processing unit is further configured to identify the object image having the object image size smaller than the size threshold as noise.

7. The interactive imaging system as claimed in claim 6, wherein the size threshold has a constant value or a variable value; and the variable value is an average size of the reference point image in one of the image frames multiplied by a ratio.

8. The interactive imaging system as claimed in claim 5, wherein the processing unit is further configured to identify whether the reference point image is a hollow image.

9. The interactive imaging system as claimed in claim 5, wherein the processing unit is further configured to identify whether the reference point image satisfies a predetermined shape.

10. An interactive imaging system, comprising:
    a display device comprising at least one reference point irradiating light of a predetermined spectrum; and
    a remote controller configured to
        successively capture, by an image sensor, a plurality of image frames containing at least one object image,
        identify a pixel or a plurality of adjacent pixels in the image frame having an intensity value larger than an intensity threshold as the at least one object image, wherein the intensity threshold is dynamically set as an average of intensity values of pixels of a previous image frame multiplied by a ratio X which is greater than zero and less than or equal to one, and the previous image frame is captured by the image sensor,
        identify the object image having an object image size larger than a size threshold, which is a predetermined number of pixels, as a reference point image associated with the reference point,
        position the reference point image, and
        correspondingly control the display device according to a position variation of the reference point image.

11. The interactive imaging system as claimed in claim 10, wherein the remote controller is further configured to identify the object image having the object image size smaller than the size threshold as noise.

12. The interactive imaging system as claimed in claim 11, wherein the remote controller is further configured to identify whether there is any pixel within the reference point image having the intensity value smaller than the intensity threshold.

13. The interactive imaging system as claimed in claim 12, wherein the remote controller is further configured to identify a hollow image according to a pixel area of the pixel within the reference point image having the intensity value smaller than the intensity threshold.

\* \* \* \* \*